HEATER FOR AEROSOL FOAM DISPENSING CONTAINERS
Filed March 26, 1968 2 Sheets-Sheet 1
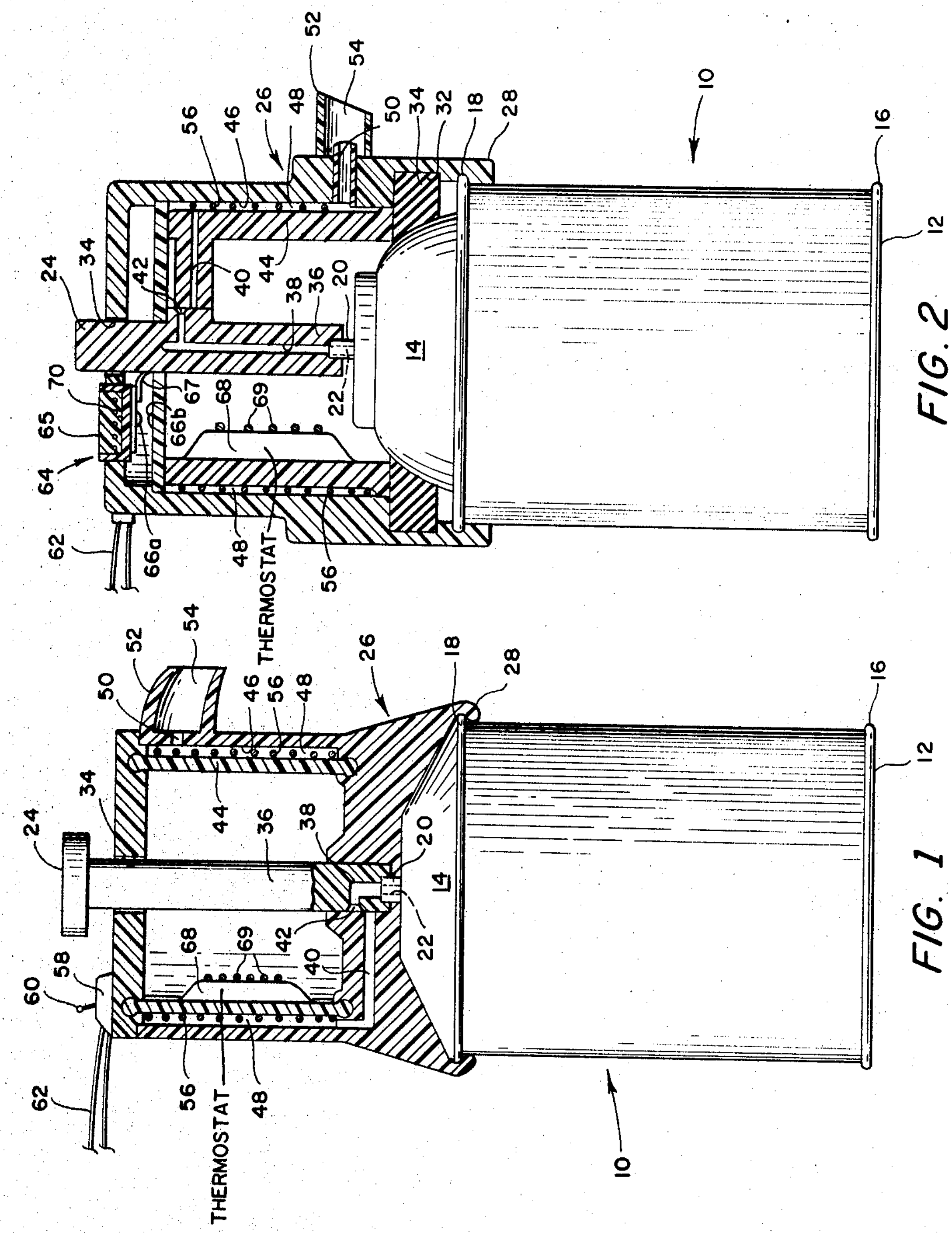
INVENTORS
IRVING REICH
CHARLES W. RODMAN
JOHN B. DAY
BY Morgan, Finnegan, Durham & Pine
ATTORNEY

HEATER FOR AEROSOL FOAM DISPENSING CONTAINERS

Filed March 26, 1968

INVENTORS
IRVING REICH
CHARLES W. RODMAN
JOHN B. DAY

BY

ATTORNEY 3,527,922

HEATER FOR AEROSOL FOAM DISPENSING CONTAINERS

Irving Reich, Cranbury Road, Princeton, N.J. 08540; John B. Day, 1065 Kendale Road N., Columbus, Ohio 43221; and Charles W. Rodman, 163 Thomas Ave., Grove City, Ohio 43123

Filed Mar. 26, 1968, Ser. No. 716,199
Int. Cl. B67d *5/62;* H05b *1/02, 3/82*
U.S. Cl. 219—308 9 Claims

ABSTRACT OF THE DISCLOSURE

An electrical heating device is provided for heating foam products as they are discharged from aerosol containers. The device rapidly heats foam products, such as foam shaving lather, by flowing the foam in direct contact with a hot electrical resistance element. A pressure-actuatable electrical switch and a thermostat heater are provided to control the flow of current to the heating element. The pressure-actuatable switch may be heated itself during operation of the heater to indicate to the user that the heating element has reached the required operating temperature.

This invention relates to a heater for aerosol containers, and more particularly to an electric heater for rapidly heating foam products, such as foam shaving lather and the like, as they are discharged from the container.

Conventional aerosol containers use a propellant gas to discharge foam products from their containers. Generally, the propellant gas is dispersed throughout the product under pressure and in liquefied form. Upon release of the discharge outlet of the container, the propellant forces the product out of the container and, simultaneously, expands to form gas bubbles and generate the foam.

Expansion of the propellant from a liquid to a gas, however, has a cooling effect on the foam product. This cooling effect is particularly undesirable in shaving lathers because cold shaving lather foams are not only uncomfortable, but also are slow in softening the beard for the shaving operation. Human hair is more easily shavel, however, when softened by the penetration of moisture from the lather, and this softening effect increases with increasing lather temperature.

For this reason, numerous heating devices have been proposed for heating foam shaving lathers as they are discharged from their containers to increase the ease and effectiveness of shaving.

Foam shaving lather is difficult to heat, however, since the gas bubbles in the lather act as heat insulators. Further, the foams have a high viscosity and although it is desirale to constrict the passage of foam so that heat can be more quickly transferred to it, such constricted flow prevents the heated foam from being supplied to the user at a useful rate.

Some of the previously proposed devices for heating foam shaving lather use electrical heating elements to heat a conduit or tube through which the foam passes. Generally, the heating element surrounds the outside of the tube and indirectly heats the lather as it passes through the tube. Other devices provide a reservoir for hot tap water that jackets the tube and also indirectly transfers heat to the lather as it passes through the tube.

These devices, however, have generally not proven entirely satisfactory in heating foam shaving lather to the desired temperature in a convenient length of time. Thus, desired foam temperatures have not been obtainable in such devices unless the foam flow rate is reduced substantially, generally about 3 cc. per second, so that the residence time in the device is long enough to allow sufficient transfer of heat to the foam. Since the average person requires about 35 cc. of lather for a single shave, a considerable time is necessary to accumulate sufficient amounts of lather. This accumulation process also allows the foam to cool, because the initial mass of heated foam is exposed to room temperature for a relatively long period before the required mass of foam is accumulated.

Further, these indirect heat transfer devices require preheating of the heat transfer tube, so that the initial mass of foam passing through the device will be heated to the desired temperature. An appreciable delay, therefore, may be encountered between the time the heating element is actuated or the reservoir is filled with hot water and the time the device becomes hot enough to heat the foam.

For these reasons, prior art lather heaters do not achieve the attributes of a desired heater for aerosol containers that requires little preheating time, that rapidly heats the foam product as it is discharged from the container, and that delivers the required amount of hot shaving lather to the user at a desirable flow rate.

Accordingly, it is a primary object of this invention to provide a new and improved heating device for rapidly heating foam products as they are discharged from aerosol containers.

Another object of this invention is to provide a heating device for aerosol foam containers that reaches its operating temperature very quickly, and rapidly heats foam to the desired temperature as the foam is discharged from the container.

Still another object of this invention is to provide a heating device that rapidly heats foam shaving lather as it is discharged from an aerosol container to a temperature substantially above room temperature and that supplies heated foam lather at a desirable flow rate.

Yet another object of this invention is to provide an electrical device for directly heating foam shaving lather as it is discharged from an aerosol container.

A further object of this invention is to provide an electrical heating device for directly heating foam shaving lather that is completely safe and avoids danger of overheating the foam.

Yet a further object of this invention is to provide an electrical heating device for directly heating foam shaving lather that can be readily attached to any conventional size aerosol container.

Still a further object of this invention is to provide an improved electrical heating device for aerosol containers that is inexpensive to manufacture, compact and rugged, simple in construction, and convenient and reliable in use.

Additional objects and advantages of the invention will be set forth in part in the description which follows and in part will be obvious from the description or may be learned by practice of the invention, the objects and advantages being realized and attained by means of the instrumentalities, devices, and combinations particularly pointed out in the appended claims.

To achieve the foregoing objects and in accordance with its purpose, this invention, as embodied and broadly described, comprises a heating device for heating foam as it is discharged from the outlet of a valve-actuated, aerosol container. The heating device includes: a housing having inlet means communicating with the outlet of the container for conducting foam discharged from the container into the housing; flow confining means mounted within the housing and defining a chamber for confining the flow of foam through said housing; foam heating means including an electrical resistance element that is exposed to the flow of foam through the chamber; control means for controlling a flow of current to the heating means; and housing outlet means for discharging heated foam from the housing.

The accompanying drawings, which are incorporated in and constitute a part of this specification, illustrate several embodiments of the invention, and together with the description, serve to explain the principles of the invention.

Of the drawings:

FIG. 1 is a sectional elevation of the heating device of this invention mounted to the top of an aerosol container;

FIG. 2 is a sectional elevation of a modification of the heating device of FIG. 1 mounted to the top of an aerosol container;

Figure 4:
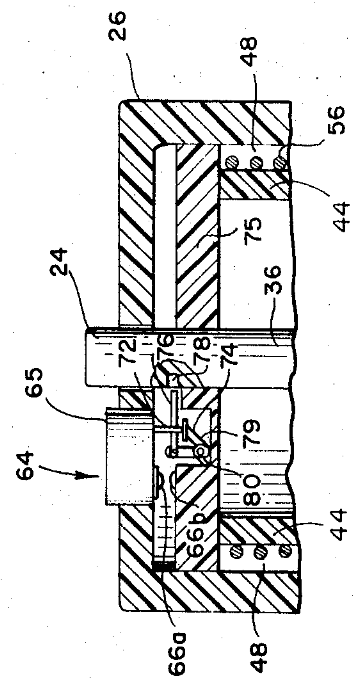
FIG. 4 is a fragmentary sectional view of still another alternative embodiment of this invention.

It is to be understood that both the foregoing general description and the following detailed description are exemplary and explanatory but are not restrictive of the invention.

Reference will now be made in detail to the present preferred embodiments of the invention, examples of which are illustrated in the accompanying drawings.

The present invention provides an electrical heating device for aerosol containers that rapidly transfers heat to foam shaving lather as the lather is discharged from the container. A typical aerosol container 10 is shown in FIG. 1. Container 10 has a bottom 12 and a lid 14, each provided with a peripheral curl 16 and 18, respectively, to secure them to the container. Lid 14 has a central opening in its top for discharge of the foam product from the container. As is customary, the product is contained within container 10 under the pressure of a propellant gas, allowing for discharge of the product through this central opening.

Valve means are provided in the opening to control the flow of foam from the container. The valve means may be conventional and suitably includes a valve actuator 20 having an outlet passage 22. When valve actuator 20 is depressed by actuation of a valve button 24, foam is expelled from the container in a controlled manner. A typical valve construction is described in U.S. Pat. 3,171,-572 to Reich et al., and reference is made to this patent for a more detailed discussion of the construction and operation of this valve. While the valve construction illustrated in Pat. 3,171,572 is suitable for use with the heating device of this invention, it will be understood, of course, that other and different forms of valve mechanisms may also be employed with the present invention.

Embodiments of the heating device of the present invention and its attachment to the top of an aerosol container are shown in FIGS. 1 and 2. The heating device includes a housing 26 made of plastic and preferably has stiffness, lightness, and a low rate of heat conduction. Suitable plastic materials for construction of the housing include linear polyethylene, polypropylene, polystyrene, or other similar materials.

In the embodiment of the invention shown in FIG. 1, the bottom of housing 26 has a configuration complementary with lid 14 of container 10 and includes a peripheral annular flange 28 that grips peripheral curl 18 of lid 14 for snap attachment of the heating device to container 10.

In the embodiment shown in FIG. 2, housing 26 additionally includes an internal annular groove 32 that contains a resilient gasket 34 for sealing housing 26 to container 10.

As shown in FIGS. 1 and 2, the sides of housing 26 extend upwardly and inwardly across the top forming an enclosure. An aperture 34 is provided in the top of housing 26. Valve button 24, having a valve stem 36, extends through aperture 34 and engages valve actuator 20 to permit actuation of the valve means when the heating device is attached to the container.

A passageway 38 is provided in stem 36 that communicates with outlet 22 of valve actuator 20 at one end and with an inlet passage 40 for the housing at its other end. Outlet 42 of passageway 38 flares outwardly and is aligned with housing inlet passage 40 when valve button 24 is depressed by the user of the device.

In accordance with the invention, flow confining means are provided within housing 26 that define a chamber for confining the flow of foam through the housing. As embodied and as shown in FIGS. 1 and 2, this confining means comprises an internal cylindrical shell 44 that is mounted within housing 26 and is spaced slightly apart from the inner wall surface 46 of housing 26 forming an annular chamber 48 that confines the flow of foam to a thin, wide sheet. Shell 44 is electrically nonconductive and preferably is constructed of ceramic material, such as glass or the like.

Chamber 48 communicates with housing inlet passage 40 and with an outlet passage 50 in the wall of housing 26. A spout 52 extends radially outward from the exterior surface of housing 26 and contains an internal conduit 54 that communicates with outlet passage 50.

In accordance with the invention, foam heating means are provided within chamber 48 to directly and rapidly heat the foam as it is discharged from the container. As embodied and as shown in FIGS. 1 and 2, this means comprises an electrical resistance heating wire 56 that is continuously wound about electrically nonconductive shell 44. Electrical resistance wire 56, which may be Nichrome wire, Chromel-A wire or the like, is bare and uninsulated wire that is exposed to and in direct contact with the flow of foam through chamber 48.

In accordance with the invention, control means are provided for controlling the flow of current to resistance wire 56 to permit the wire to achieve the required operating temperature. As embodied, and as shown in FIG. 1, the control means comprises an electrical switch 58 mounted to housing 26 and electrically connected to both resistance heating wire 56 and to a conventional supply of house current through an electrical cord 62. Switch 58 is conventional and includes a toggle arm 60 for moving the switch between an "OFF" and "ON" position.

As shown in the modification in FIG. 2, the control means comprises a finger pressure-actuatable switch 64 that is electrically connected to resistance heating wire 56 and to a conventional house supply of current through electrical cord 62. Switch 64 includes a switch button 65, a pair of electrical contacts **66*a* and 66*b*, and a spring 67 tending to separate contacts 66 and to maintain switch 64 in the "OFF" position shown in FIG. 2. When switch button 65 is depressed by the user of the device and contact is made between contacts 66, electrical current flows through resistance heating wire 56. Upon release of button 65, spring 67 breaks contact between contacts 66** and the flow of current to the resistance wire is interrupted.

To prevent overheating of the resistance wire or the foam, the control means of the present device may include a thermostat 68 which automatically interrupts the flow of current to resistance wire 56 when the wire has reached the required operating temperature.

As shown in FIGS. 1 and 2, thermostat 68 is mounted on the inner side of shell 44 and is electrically connected between the electrical switch and resistance wire 56. The thermostat is a heater thermostat and includes its own heating element 69 which is also connected to the supply of current through the electrical switch. Thermostat 68 senses the heat from element 69 and automatically terminates the flow of current to wire 56 when the temperature in thermostat heater wire 69 has reached a preselected temperature that corresponds to the desired operating temperature of resistance wire 56.

In operation of the heating device shown in FIG. 1, the user plugs cord 62 into a conventional house outlet (110 volt AC) and moves toggle 60 to the "ON" position. Current then flows through electrical resistance wire 56 and heats it up very quickly to the desired temperature (about 200° F.), preferably within about ten (10) seconds. Thermostat heater wire 69 is also heated, and when it reaches a preselected temperature, thermostat 68 interrupts the flow of current to heating wire 56. A noise, such as a click, audible to the user of the device, may be provided in thermostat 68 to indicate that the thermostat has interrupted the flow of current to wire 56 and that wire 56 has reached the desired operating temperature.

The user then moves electrical switch 58 to the "OFF" position, and depresses valve button 24, which in turn actuates valve actuator 20. The propellant within aerosol container 10 propels the product out of the container through outlet 22 in valve actuator 20, through passageway 38 in valve stem 36, and thence into housing inlet passage 40 and chamber 48. As the foam enters chamber 48, it is formed into a thin, wide sheet by the confining walls, 44 and 46, of the chamber. Under the contained pressure of the container, the foam product proceeds through chamber 48 toward outlet passage 50, where it emerges from spout 52.

As the foam passes through chamber 48, a rapid heat transfer occurs through intimate contact of the foam with the hot surface of resistance wire 56. Because the product is confined to a thin, wide sheet during its passage through chamber 48, intimate contact of the mass of foam with wire 56 is assured and the formation of multiple layers of bubbles, which would otherwise act as heat insulators, is reduced. A high rate of heat transfer, therefore, occurs in the heating device of the present invention, and permits the foam to be discharged from the device at a temperature close to the temperature of hot wire 56—preferably at a temperature of from 130 to 160° F.

In the operation of the heating device shown in FIG. 2, the user depresses button 65 of switch 64 to engage contacts 66 and transmit current to electrical resistance heating wire 56. After resistance wire 56 reaches the required operating temperature, as indicated by the temperature of thermostat heater wire 69, thermostat 68 automatically interrupts the flow of current to resistance wire 56. A clicking noise or other indicative means, such as an indicator light, may be provided to indicate to the user that the wire has reached the required operating temperature. The user then releases the pressure on button 65, which separates contacts 66, and depresses valve button 24 to discharge foam from container 10 into chamber 48 and into direct contact with the hot surface of resistance wire 56 in the same manner described above.

Pressure-actuable electrical switch 64 provides an added safety factor over toggle switch 58 since current only flows to resistance wire 56 of the heating device of FIG. 2, when switch button 65 is depressed by the user. If, for any reason, the user forgets to turn off the device or accidentally drops the container, the release of pressure on switch button 65 automatically interrupts the flow of current to the heating wire. Further, since finger pressure is also required to discharge the foam from container 10, the user will have to release switch button 65 before valve button 24 can be depressed by the same finger.

Figure 3:
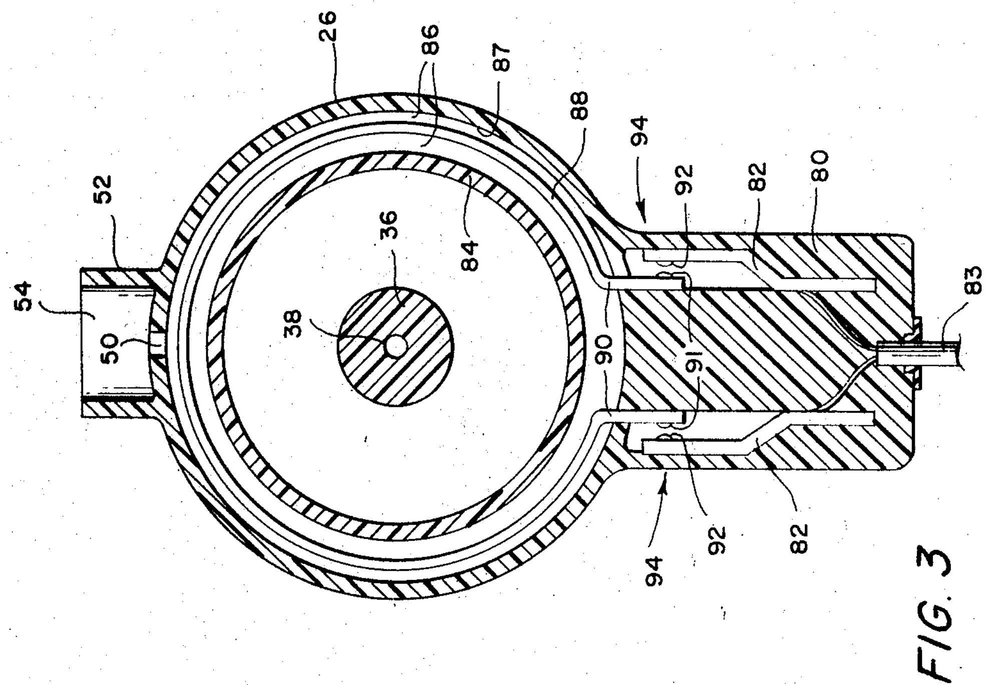
FIG. 3 is a top sectional view showing an alternative embodiment of this invention.

In accordance with a preferred embodiment of the invention, switch heating means are provided that render the pressure-actuatable switch heat sensitive to the touch. The switch heating means guard against excessive heating of the foam shaving lather, and also indicate to the user of the device when heating wire 56 has reached the required operating temperature. As embodied and as shown in FIGS. 2 and 3, the switch heating means comprises an electrical resistance heating element located within the finger pressure-actuatable electrical switch that controls the flow of current to the heating device.

In the embodiment shown in FIG. 2, the switch heating means comprises electrical resistance wire 70, electrically connected to the supply of current and energized when contacts **66*a* and 66*b* are brought together by depression of switch button 65. The flow of current through switch heater wire 70 heats up button 65 simultaneously with the flow of current through heating wire 56 and thermostat heater wire 69. Pressure is maintained on button 65 by the finger of the user until the button begins to feel warm or hot to the touch. The resistance of switch heater wire 70 is preselected so that when switch button 65 becomes warm to the touch, heating wire 56** has reached the required operating temperature.

As an additional safety precaution, thermostat 68 can also be provided to automatically interrupt the flow of current to heating wire 56 if switch button 65 has not been released by the user of the device when the predetermined temperature has been reached.

After the user releases pressure on heated button 65, valve button 24 is depressed and the foam is discharged from the container into chamber 48 in the same manner described above.

FIG. 3 illustrates yet another form of the invention that includes a heat sensitive, pressure-actuatable switch for an electrical heating device for an aerosol container. The construction of the device of FIG. 3, including the housing and the inlet and outlet means, is similar to the device illustrated in FIGS. 1 and 2, except for the following variations.

In the device of FIG. 3, an extension or handle 80 is provided on housing 26 and includes a pair of flexible electrical switch plates 82. Plates 82 are mounted within handle 80 and electrically connected to a supply of current through cord 83. Handle 80 and housing 26 are constructed of a suitable plastic material. An inner cylindrical shell 84 is mounted within housing 26 to form an annular heating chamber 86 with the inside wall 87 of the housing. Shell 84 may also be constructed of plastic material or may be ceramic or glass.

An electrical resistance heating element 88 is secured to housing 26 at 90 and extends around heating chamber 86 between inner wall 87 of housing 26 and the outer wall of shell 84. Heating element 88 can be a relatively rigid strip of electrical resistance metal so that it maintains its cylindrical shape apart from the walls of heating chamber 86.

Resistance element 88 includes a pair of electrical contacts 91 that are engaged by contacts 92 on flexible switch 82 when pressure is applied to the sides of handle 80 at 94. Switch plates 82 are also constructed of electrical resistance metal that heats up as current passes through the switch. Thus, finger pressure is maintained at 94 and current flows through switch heater plates 82 and resistance element 88 until the sides of handle 80 begin to feel warm to the touch. The resistance of flexible electrical switch plates 82 is selected so that the warmth of the switch signals the user to interrupt the flow of current. This signal prevents underheating or overheating of resistance element 88.

After the user releases pressure at 94 to interrupt the flow of current to heating element 88, the valve button of the container (not shown) is actuated and foam is discharged into chamber 86 and into intimate contact with hot resistance element 88 in the same manner described above.

In accordance with a further object of this invention, locking means can be provided in the heating device of FIG. 2 to prevent discharge of foam from container 10 into heating chamber 48 while current is flowing to electrical resistance wire 56. As embodied, and as shown in FIG. 4, this means comprises a pin 72 that is attached to and extends downwardly from switch button 65 and engages a crank arm 74. Crank arm 74 is pivotally mounted in switch plate 75 of housing 26 and includes locking pin 76 that extends into slot 78 in the side of valve stem 36 when crank arm 74 is rotated by depression of button 65. A torsion spring 79, mounted about the axis 80 of crank arm 74, urges crank arm 74 and switch button 65 to the "OFF" position, as shown in FIG. 4.

In operation of the device shown in FIG. 4, depression of switch button 65, in opposition to torsion spring 79, engages contacts 66*a* and 66*b* and energizes electrical resistance wire 56 in heating chamber 48. Depression of switch button 65 also rotates crank arm 74 about axis 80 in a clockwise direction and slides locking pin 76 into slot 78 to prevent depression of valve button 24. Foam therefore cannot be discharged into chamber 48 when switch button 65 is depressed and current is flowing to heating wire 56.

Upon release of switch button 65, spring 79 pivots crank arm 74 in a counterclockwise direction, pushing switch button 65 back to its initial position and pulling locking pin 76 out of slot 78. Valve button 24 can then be depressed to permit discharge of foam from the container into heating chamber 48 and into contact with hot resistance wire 56.

While a separate heating device for removable attachment to an aerosol container has been illustrated in the accompanying drawings, it will be understood from the above description that the heating device of this invention may also be made a permanent or integral part of the aerosol container.

The invention in its broader aspects is not limited to the specific details shown and described, and departures may be made from such details within the scope of the accompanying claims without departing from the principles of the invention and without sacrificing its chief advantages.

What is claimed is:

1. An electrical heating device for heating foam as it is discharged from the outlet of a valve actuated, aerosol container, which comprises a housing having inlet means communicating with the outlet of the container for conducting foam discharged from the container into the housing, electrical foam heating means to heat the foam as it passes through the housing, and a finger pressure-actuable electrical switch that controls the flow of current to the heating means, said switch including switch heating means that heats the switch actuator and renders it warm to the touch to signal the user that the foam heating means has reached the desired temperature.

2. A heating device for heating foam as it is discharged from the outlet of a valve-actuated aerosol container, comprising:

(a) a housing having inlet means communicating with the outlet of the container for conducting foam discharged from the container into the housing;
(b) flow confining means mounted within the housing and defining a chamber for confining the flow of foam through said housing;
(c) foam heating means including an electrical resistance element that is exposed to the flow of foam through the chamber;
(d) control means for controlling the flow of current to the heating means comprising a finger pressure-actuable electrical switch that has an electrical switch heating means that heats the switch actuator and renders it warm to the touch to signal the user than the foam heating means has reached the desired temperature whereupon the release of pressure from said finger pressure-actuable electrical switch interrupts the flow of current to the heating means; and
(e) housing outlet means for discharging heated foam from the housing.

3. The heating device of claim 2, which includes locking means that prevents actuation of the container outlet valve while current is flowing to the foam heating means.

4. The heating device of claim 3, including a valve button for actuating the container outlet valve and said locking means preventing movement of the valve button upon actuation of said switch.

5. The heating device of claim 2, in which the flow confining means confines the flow of foam to a thin, wide sheet.

6. The heating device of claim 5, in which the flow confining means is constructed of electrical insulation material, and the electrical resistance element is a bare electrical resistance wire that is mounted to the confining means and exposed to the flow of foam through the chamber.

7. The heating device of claim 6, in which the housing is cylindrical and the confining means is a concentrically mounted inner cylindrical shell that forms an annular chamber with the inner wall surface of the housing, said bare electrical resistance wire being wrapped around the external wall surface of the inner cylindrical shell.

8. A heating device for heating foam as it is discharged from the outlet of a valve-actuated aerosol container comprising:

(a) a housing having inlet means communicating with the outlet of the container for conducting foam discharged from the container into the housing;
(b) flow confining means mounted within the housing and defining the chamber for confining the flow of foam through said housing;
(c) foam heating means including an electrical resistance element that is exposed to the flow of foam through the chamber;
(d) means for controlling the flow of current from a source to said heating means, said means comprising:
  (1) a thermal indicating manual pressure actuated switch that is electrically coupled so as to control the flow of current to said foam heating means, at least the actuator of said switch being heated by said source to indicate when said foam heating means has reached its operating temperature;
  (2) a thermostat having its own heating means coupled to said source, said thermostat being electrically coupled so as to interrupt the flow of current from said source to said foam heating means when said thermostat heating means reaches a temperature greater than the operating temperature of said foam heating means; and
(e) housing outlet means for discharging heated foam from the housing.

9. A heating device for heating foam as it is discharged from the outlet of a valve-actuated aerosol container comprising:

(a) a housing having inlet means communicating with the outlet of the container for conducting foam discharged from the container into the housing;
(b) flow confining means mounted within the housing and defining a chamber for confining the flow of foam through said housing;
(c) foam heating means including a first electrical resistance element that is exposed to the flow of foam through the chamber;
(d) means for controlling the flow of current from a source to said foam heating means, said means comprising:
  (1) a first switching means coupled so as to control the flow of current to said first electrical resistance element of said foam heating means, said first switching means being manually operated and having a second electrical resistance element whose electrical characteristics are related to those of said first electrical resistance element such that at least the actuator of said first switching means becomes heated by said second electrical resistance element to indicate when said first electrical resistance element of said foam heating means has become heated to its operating temperature;

(2) a second switching means coupled so as to control the flow of current to said first electrical resistance element of said foam heating means, said second switching means having a third electrical resistance element whose electrical characteristics are related to those of said first electrical resistance element such that said second switching means becomes heated by said third electrical resistance element to a temperature sufficient to have said second switching means automatically disconnect said first electrical resistance element from said source when said first electrical resistance element becomes heated above its operating temperature; and (e) housing outlet means for discharging heated foam from the housing.

References Cited

UNITED STATES PATENTS

| | | | |
|---|---|---|---|
| 793,118 | 6/1905 | Wright et al. | 219—307 |
| 1,383,033 | 6/1921 | Seimbille | 219—307 |
| 3,307,747 | 3/1967 | Pacitti | 219—306 X |
| 3,312,375 | 4/1967 | Williams. | |
| 3,372,840 | 3/1968 | Kelley. | |

OTHER REFERENCES

Schomann: German application 1,060,065, published June 25, 1959.

ANTHONY BARTIS, Primary Examiner

U.S. Cl. X.R.

219—307, 328, 506, 511; 222—146; 239—136